United States Patent [19]
Atlas

[11] Patent Number: 5,930,024
[45] Date of Patent: Jul. 27, 1999

[54] SUPPRESSION OF STIMULATED BRILLOUIN SCATTERING IN OPTICAL TRANSMISSION SYSTEM

[75] Inventor: Dogan Atlas, Duluth, Ga.

[73] Assignee: Scientific-Atlanta, Inc., Norcross, Ga.

[21] Appl. No.: 08/970,123

[22] Filed: Nov. 13, 1997

Related U.S. Application Data

[62] Division of application No. 08/741,251, Oct. 30, 1996
[60] Provisional application No. 60/029,588, Oct. 23, 1996.

[51] Int. Cl.$^6$ .............................. H04B 10/04; G02F 1/01
[52] U.S. Cl. ........................................... 359/279; 359/183
[58] Field of Search ................................... 359/181–183, 359/279

[56] References Cited

U.S. PATENT DOCUMENTS

| | | | |
|---|---|---|---|
| 4,299,484 | 11/1981 | Holzapfel | 356/28.5 |
| 5,042,086 | 8/1991 | Cole et al. | 455/606 |
| 5,166,821 | 11/1992 | Huber | 359/238 |
| 5,293,545 | 3/1994 | Huber | 359/111 |
| 5,315,426 | 5/1994 | Aoki | 359/180 |
| 5,327,279 | 7/1994 | Farina et al. | 359/180 |
| 5,329,396 | 7/1994 | Fishman et al. | 359/173 |
| 5,359,450 | 10/1994 | Ramachandran et al. | 359/188 |
| 5,420,868 | 5/1995 | Chraplyvy et al. | 370/122 |
| 5,436,749 | 7/1995 | Pidgeon, Jr. et al. | 359/161 |
| 5,444,562 | 8/1995 | Fuse | 359/161 |
| 5,453,868 | 9/1995 | Blauvelt et al. | 359/173 |
| 5,477,368 | 12/1995 | Eskildsen et al. | 359/188 |
| 5,515,196 | 5/1996 | Kitajima et al. | 359/180 |
| 5,550,667 | 8/1996 | Krimmel et al. | 359/180 |
| 5,566,381 | 10/1996 | Korotky | 359/183 |
| 5,699,179 | 12/1997 | Gopalakrishnan | 359/183 |

*Primary Examiner*—Georgia Epps
*Assistant Examiner*—Margaret Burke
*Attorney, Agent, or Firm*—Kenneth M. Massaroni; Kelly A. Gardner; Hubert J. Barnhardt III

[57] ABSTRACT

An optical modulator for a high power laser transmitter includes a laser source coupled through a phase modulator to a signal modulator. A noise source provides a band limited noise signal to either the laser source or the phase modulator or both. Alternatively, an optical modulator for a high power laser transmitter includes a laser source providing a laser output optical signal and a phase modulator. First and second continuous wave signals at respective first and second frequencies are combined to modulate either the laser source or the phase modulator. The first frequency is different than the second frequency. The laser and phase modulation produces a broadened optical output signal such that the broadened optical output signal is characterized by beat frequencies harmonically related to the first and second frequencies. The modulation bandwidth includes no significant beat frequencies. Each of the multiple beat frequencies produced has a correspondingly reduced amplitude but has the same laser line width, thus increasing the power that can be injected into the fiber before the onset of stimulated Brillouin scattering.

16 Claims, 6 Drawing Sheets

SUPPRESSION OF STIMULATED BRILLOUIN SCATTERING IN OPTICAL TRANSMISSION SYSTEM

This application is a divisional of application Ser. No. 08/741,251 filed Oct. 30, 1996.

Benefit of the Oct. 23, 1996 filing date of the provisional application 60/029,588 by the same inventor and entitled "Suppression of Stimulated Brillouin Scattering in Optical Transmission System" is hereby claimed.

BACKGROUND OF THE INVENTION

1. Field of the Invention

The present invention relates to a single mode fiber optical transmitter system capable of suppressing stimulated Brillouin scattering. In particular, the invention relates to a high power transmitter that broadens the spectral width of its laser source, a modulator or both by noise insertion or by multiple beat frequency insertion. Each of the multiple beat frequencies has a corresponding reduced amplitude but has the same laser line width, thus increasing power that can be injected into the fiber before the onset of stimulated Brillouin scattering.

2. Description Of Related Art

High power laser transmitters are required to transmit high quality AM-VSB video channels from point to point over long single mode optical fiber links. For example, long line transmission of information channels is required from headend to headend or from headend to primary hubs in cable television networks where information may be broadcast to several nodes. In FIG. 7, known optical transmission system 10 includes optical transmitter 12, fiber link 14 and optical receiver 16. Optical transmitter 12 includes modulation section 20 and amplifier 18. Modulation section 20 includes laser source 22 and signal modulator 26.

Where high optical powers are launched into long single mode fiber lengths non-linear effects such as stimulated Brillouin scattering (SBS) of the fiber degrades signal quality. Both received optical signal power is reduced, and scattering noise is induced at the receiver.

The degree of signal quality degradation generally depends on the laser source line width, the launched optical power and the system fiber length. This degradation is minimal below a threshold power density level which is about 6.2 dBm for externally modulated optical transmitters. This SBS gain threshold is increased proportionally when the source line width increases.

Known semiconductor DFB and solid state laser sources have narrow line widths. System signal quality (i.e., system carrier-to-noise ratio measured at the optical receiver) is increased when techniques are used to broaden the laser source line width in long distance optical fiber transmission systems. As the laser source line width is increased, the optical power density of the information carrying optical signal is reduced, and the SBS gain threshold is increased.

In FIG. 8, known modulation section 20 (i.e., from system 10 of FIG. 7), includes laser source 22 to generate the optical signal. The optical signal is coupled to signal modulator 26 where it is modulated according to information signal $S_{IN}$. Modulation section 20 also includes continuous wave (CW) source 28 coupled to laser source 22. Laser source 22 is modulated according to a signal from CW source 28. This broadens the effective spectral width from laser source 22 by imparting a periodic frequency modulation to the optical frequency of the laser source.

In U.S. Pat. Nos. 5,477,368 to Eskildsen et al. and 5,329,396 to Fishman et al., both incorporated herein by reference, there is described a dither signal from a CW source to directly modulate the laser source where the dither signal is either a sinusoidal or square waveform. In U.S. Pat. No. 5,359,450 to Ramachandran et al., incorporated herein by reference, there is described a distributed feedback laser source modulated by a CW signal having a frequency of about 1 GHz. In U.S. Pat. No. 5,453,868 to Blauvelt et al., incorporated herein by reference, there is described a laser source modulated by a chirp generating signal (e.g., sawtooth waveform).

In FIG. 9, known modulation section 20 includes laser source 22 optically coupled to phase modulator 24 optically coupled in turn to signal modulator 26. Modulation section 20 also includes broad band noise source 30 coupled to phase modulator 24. Phase modulator 24 is modulated according to a signal from broad band noise source 30. This broadens the effective spectral line width of the optical signal coupled from phase modulator 24 to signal modulator 26 by imparting a random frequency modulation to the optical frequency input to signal modulator 26.

In U.S. Pat. No. 5,166,821 to Huber, incorporated herein by reference, there is described a broad band electrical noise source coupled to an optical modulator.

In FIG. 10, known modulation section 20 includes laser source 22 optically coupled to phase modulator 24 optically coupled in turn to signal modulator 26. Modulation section 20 also includes CW source 32 coupled to phase modulator 24. Phase modulator 24 is modulated according to a signal from CW source 32. This broadens the effective spectral line width of the optical signal coupled from phase modulator 24 to signal modulator 26 by imparting a periodic frequency modulation to the optical frequency input to signal modulator 26.

SUMMARY OF THE INVENTION

It is an object to the present invention to provide an optical modulator for an optical transmitter that achieves a broadened optical spectral width. It is a further object of the present invention to provide an optical modulator for an optical transmitter that achieves a high carrier-to-noise ratio in the optical output signal.

These and other objects are achieved in an optical modulator for a high power laser transmitter that includes a laser source, a phase modulator coupled to the laser source and a band limited noise source providing a band limited noise signal coupled to either the laser source or the phase modulator or both. In the optical modulator, the band limited noise source includes a wide band noise source coupled through a band limiting filter to provide the band limited noise signal. The optical modulator further includes a signal modulator coupled to a broadened optical output signal of the phase modulator, where the signal modulator is driven by a modulation signal characterized by an upper band limit and the band limited noise source provides the band limited noise signal such that the band limited noise signal is characterized by a lower band limit. The lower band limit of the noise signal is greater than the upper band limit of the modulation signal.

Alternatively, these and other objects are achieved in an optical modulator for a high power laser transmitter that includes a laser source providing a laser output optical signal, a phase modulator coupled to the laser source, a first continuous wave signal source providing a first continuous wave signal at a first frequency coupled to modulate the laser output optical signal and a second continuous wave signal source providing a second continuous wave signal at a second frequency coupled to modulate a modulator output signal from the phase modulator. The first frequency is different than the second frequency. The optical modulator further includes a signal modulator coupled to a broadened optical output signal of the phase modulator, where the signal modulator is driven by a modulation signal, the modulation signal being characterized by a modulation bandwidth and the phase modulator produces the broadened optical output signal such that the broadened optical output signal is characterized by beat frequencies harmonically related to the first and second frequencies. The modulation bandwidth includes no beat frequencies. The first frequency signal is much greater than the upper band limit of the modulation signal, preferably at least an octave greater.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
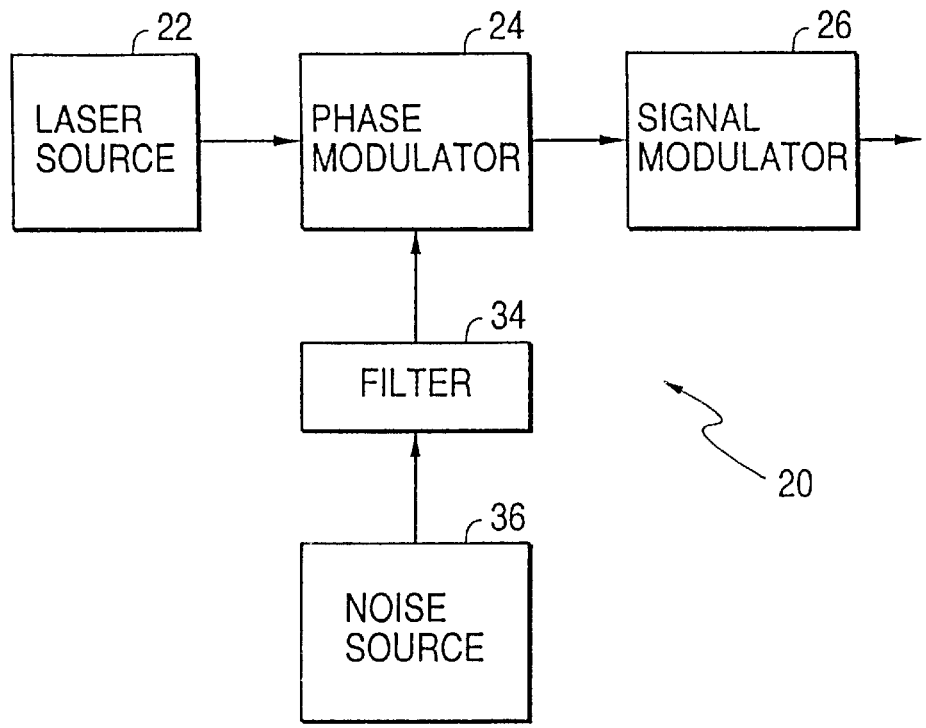
FIGS. 1–6 are block diagrams of six embodiments of the present invention.
Figure 8:
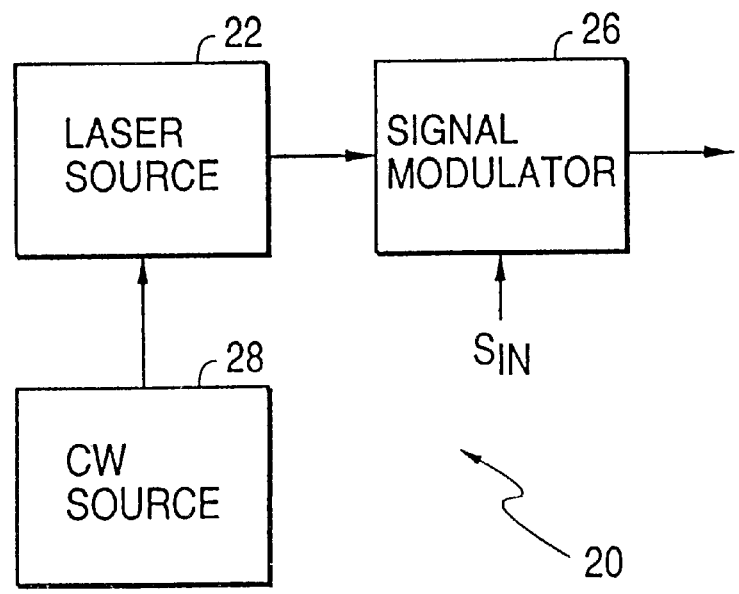
FIGS. 8–10 are a block diagrams of known optical modulators.
Figure 9:
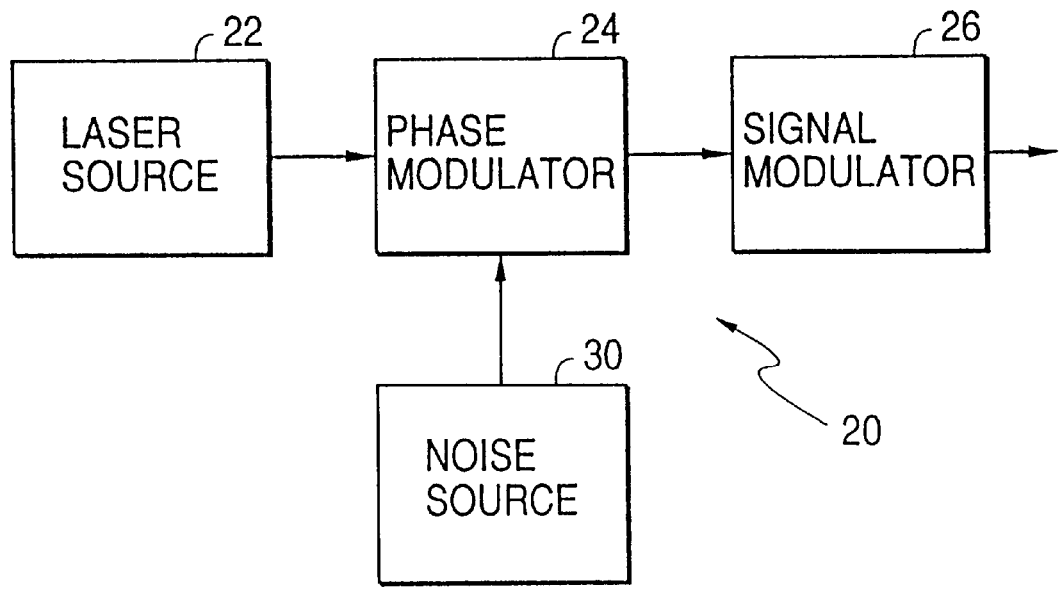
Figure 10:
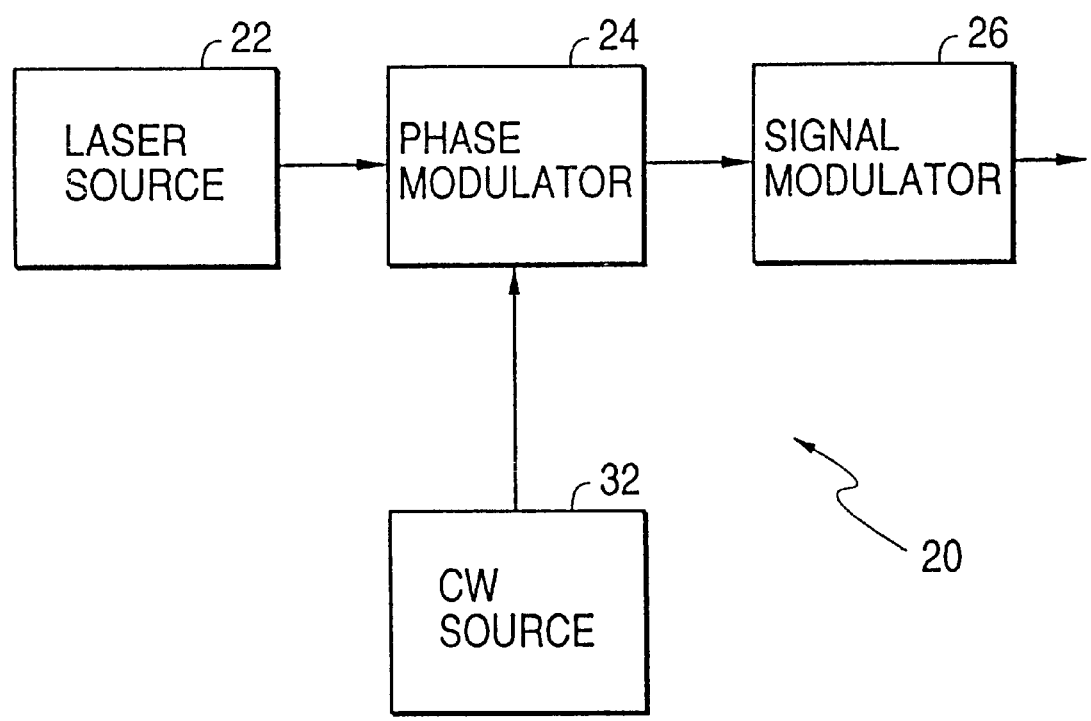

In FIG. 1, improved modulation section 20 includes laser source 22 optically coupled to phase modulator 24 optically coupled in turn to conventional signal modulator 26. Modulation section 20 also includes broad band noise source 36 coupled through filter 34 to phase modulator 24. Phase modulator 24 is modulated according to a signal from filter 34. The filter is preferably a band pass filter designed so that a lower band limit of filter 34 is greater than an upper band limit of the information signal (e.g., $S_{IN}$ as depicted in FIG. 8) provided to signal modulator 26. In this way optical line width broadening is achieved while the information signal remains un-degraded by noise from noise source 36.

The emission wavelength of the laser source is preferably around 1550 nm where conventional 1310 nm optimized single mode fibers have a minimum optical loss window. Modulator 24 is preferably external to the laser source to reduce fiber dispersion induced distortion which can degrade system performance. External modulator 24 may be achieved using known $LiNbO_3$ (lithium niobate) modulators that are capable of intensity and phase modulation.

Figure 2:
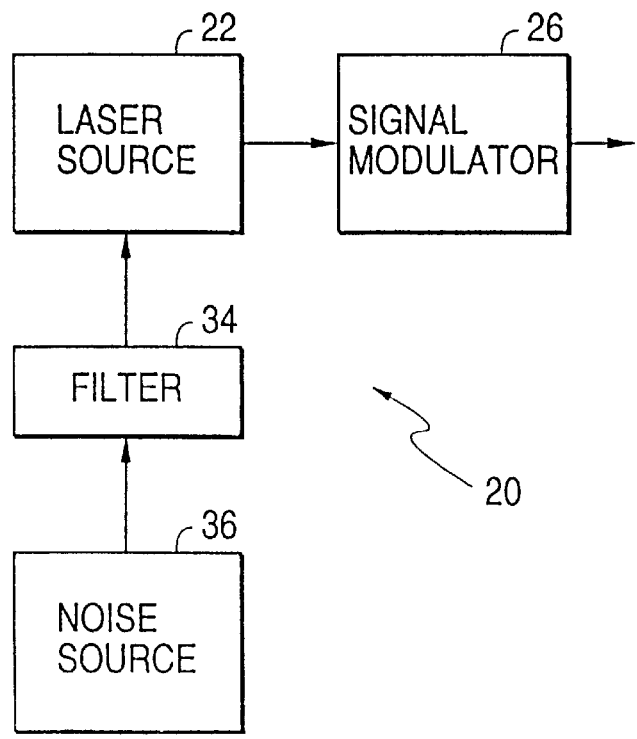

In FIG. 2, improved modulation section 20 includes laser source 22 optically coupled to signal modulator 26. Modulation section 20 also includes broad band noise source 36 coupled through filter 34 to laser source 22. Laser source 22 is modulated according to a signal from filter 34. The filter is preferably a band pass filter designed so that a lower band limit of filter 34 is greater than an upper band limit of the information signal (e.g., $S_{IN}$ as depicted in FIG. 8) provided to signal modulator 26. In this way optical line width broadening is achieved while the information signal remains un-degraded by noise from noise source 36.

Figure 3:
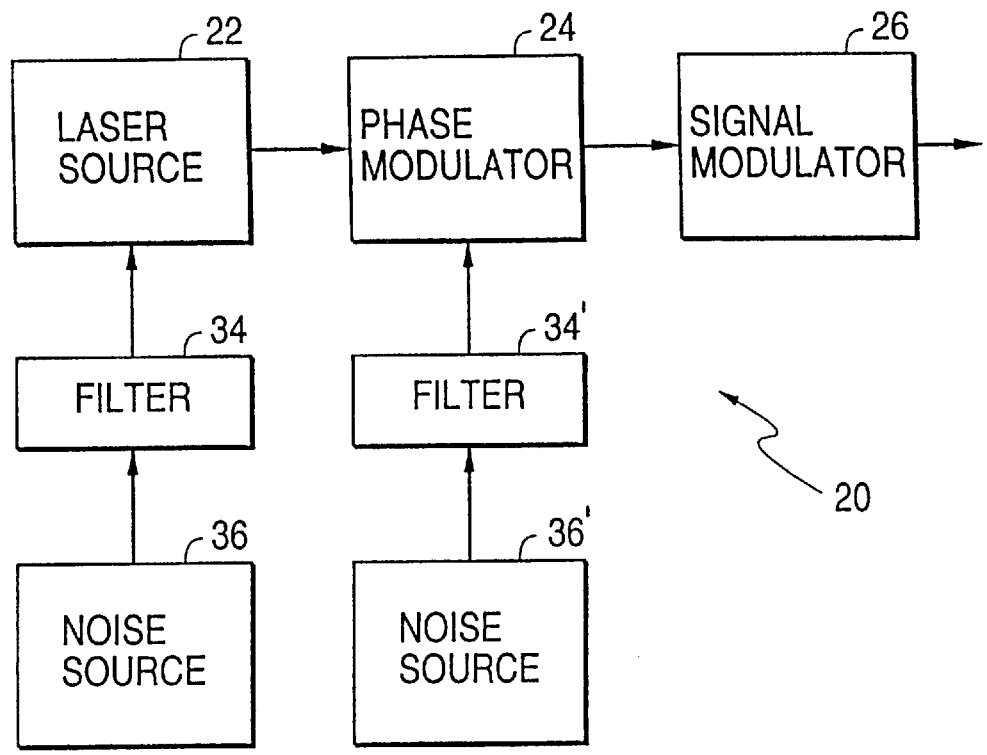

In FIG. 3, improved modulation section 20 includes laser source 22 optically coupled to phase modulator 24 optically coupled in turn to signal modulator 26. Modulation section 20 also includes broad band noise sources 36 and 36' coupled through respective filters 34 and 34' to laser source 22 and phase modulator 24, respectively. Laser source 22 is modulated according to a signal from filter 34, and phase modulator 24 is modulated according to a signal from filter 34'. The filters are preferably band pass filters designed so that a lower band limit of filters 34 and 34' is greater than an upper band limit of the information signal (e.g., $S_{IN}$ as depicted in FIG. 8) provided to signal modulator 26 by an octave or more. In this way optical line width broadening is achieved while the information signal remains un-degraded by noise from noise sources 36 and 36'.

When the source field is both directly and/or externally bandpass noise modulated, the apparent source line width is broadened to an extent determined by the FM and/or PM efficiency of the laser and/or modulator, respectively. To eliminate noise leaking into the cable television band and corrupting the signal quality, it is important that the lowest cut-off frequency of the band pass noise spectrum is selected to be much higher than the highest television channel frequency, preferably about an octave higher than the highest television frequency. Since practical phase modulators cause spurious AM, the above mentioned rule should be applied when designing a noise modulating phase modulator.

Figure 4:
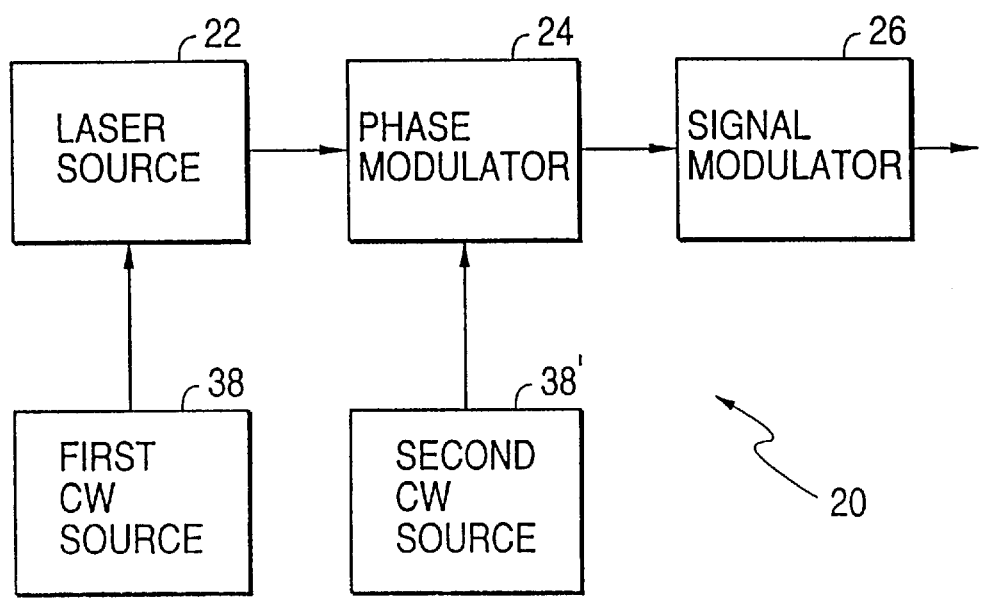

In FIG. 4, improved modulation section 20 includes laser source 22 optically coupled to phase modulator 24 optically coupled in turn to signal modulator 26. Modulation section 20 also includes first CW source 38 coupled to laser source 22 and second CW source 38' coupled to phase modulator 24. Laser source 22 is modulated at a first frequency according to a first signal from first CW source 38, and phase modulator 24 is modulated at a second frequency according to a second signal from second CW source 38'. The periodic frequency modulation generated at the output of phase modulator 24 includes the effects of interaction between the first and second frequencies. These effects include the generation of beat frequencies harmonically related to the first and second frequencies. The first frequency is much greater than the upper band limit of the modulation signal, preferably at least an octave greater.

The information signal (e.g., $S_{IN}$ as depicted in FIG. 8) provided to signal modulator 26 is characterized by a band width having upper and lower band limits. The first and second frequencies are preferably selected so that no significant beat frequency is generated within the band width of the information signal. For example, in a cable television system designed to carry 110 channels on a 6 MHZ channel spacing, the information signal may be provided on frequencies over a band width between 50 MHZ and 750 MHZ. The first and second frequencies should be selected so that no significant beat frequency is generated between 50 MHZ and 750 MHZ. A first significant beat signal is generated with a beat frequency equal to the difference between the first and second frequencies. A second significant beat frequency is generated with a frequency equal to the difference between the second frequency and twice the first frequency. When the broad spectral width of the optical source encounters fiber chromatic dispersion in a long distance transmission system, phase modulation is converted into amplitude modulation, and the multiple beat signals are detected by optical receiver 16. In this example, the first and second frequencies may be selected to be 2.28 GHz and 3.8 GHz, respectively, so that the first and second beat frequencies are 1.52 GHz and 0.76 GHz, respectively.

In general, beat frequencies of:

$$N^*f_1 \pm M^*f_2,$$

will be generated where $f_1$ and $f_2$ are the first and second frequencies and N and M take on all integer values. Small values of N and M (e.g., 1, 2 and maybe 3) generate what may be referred to as significant beat frequencies. According to experiments, frequencies $f_1$ and $f_2$ are preferably chosen such that $f_2=f_1*F$ where $F=(N+1)/(M+1)$ and $f_2>f_1$. Higher values of N and M generated beat frequencies with only a small power content and may be disregarded, but this depends on the system distortion tolerance of the system being designed.

When the laser source is directly modulated by one tone oscillator and the laser source output is externally modulated (e.g., phase modulated or frequency modulated) by an external modulator driven by a second independent oscillator, the spectral width is broadened more effectively (e.g., more beat notes produced at various harmonically related frequencies) than just by modulating externally the phase port or directly modulating the laser source by a single oscillator.

Figure 5:
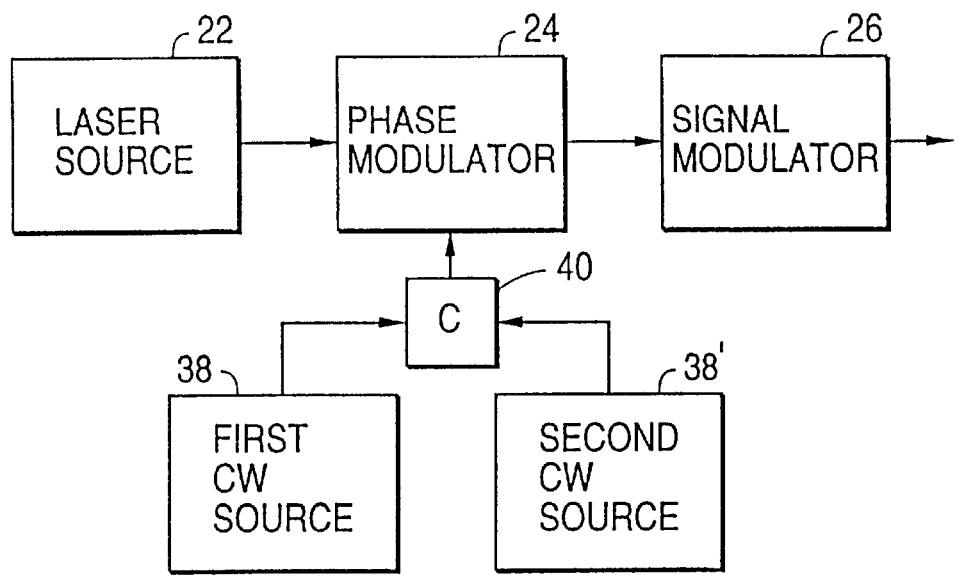

In FIG. 5, laser source 22 is optically coupled through phase modulator 24 to signal modulator 26. First and second CW sources 38 and 38' are combined in combiner 40. The output of combiner 40 is used to drive phase modulator 24. In operation, the signals from CW sources 38 and 38' combine in combiner 40 by principals of superposition, and phase modulator 24 imparts a phase modulation to the optical signal corresponding to each of the signals from CW sources 38 and 38'. It will be appreciated that three or more CW sources may be similarly combined to provide a combined signal rich in beat frequencies to spread the spectral width of the optical signal.

Figure 6:
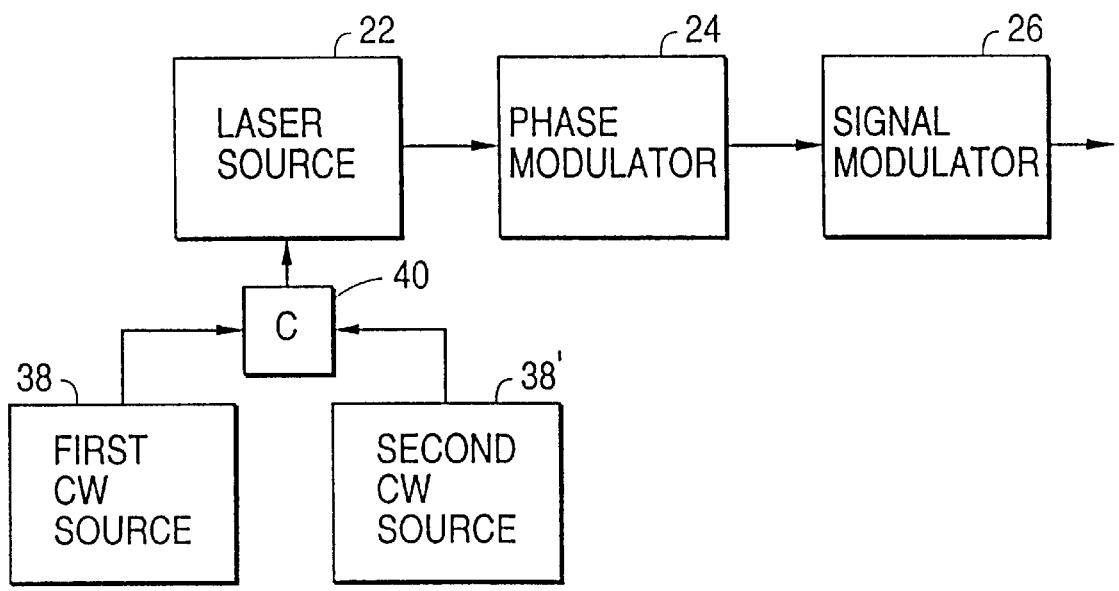
Figure 7:
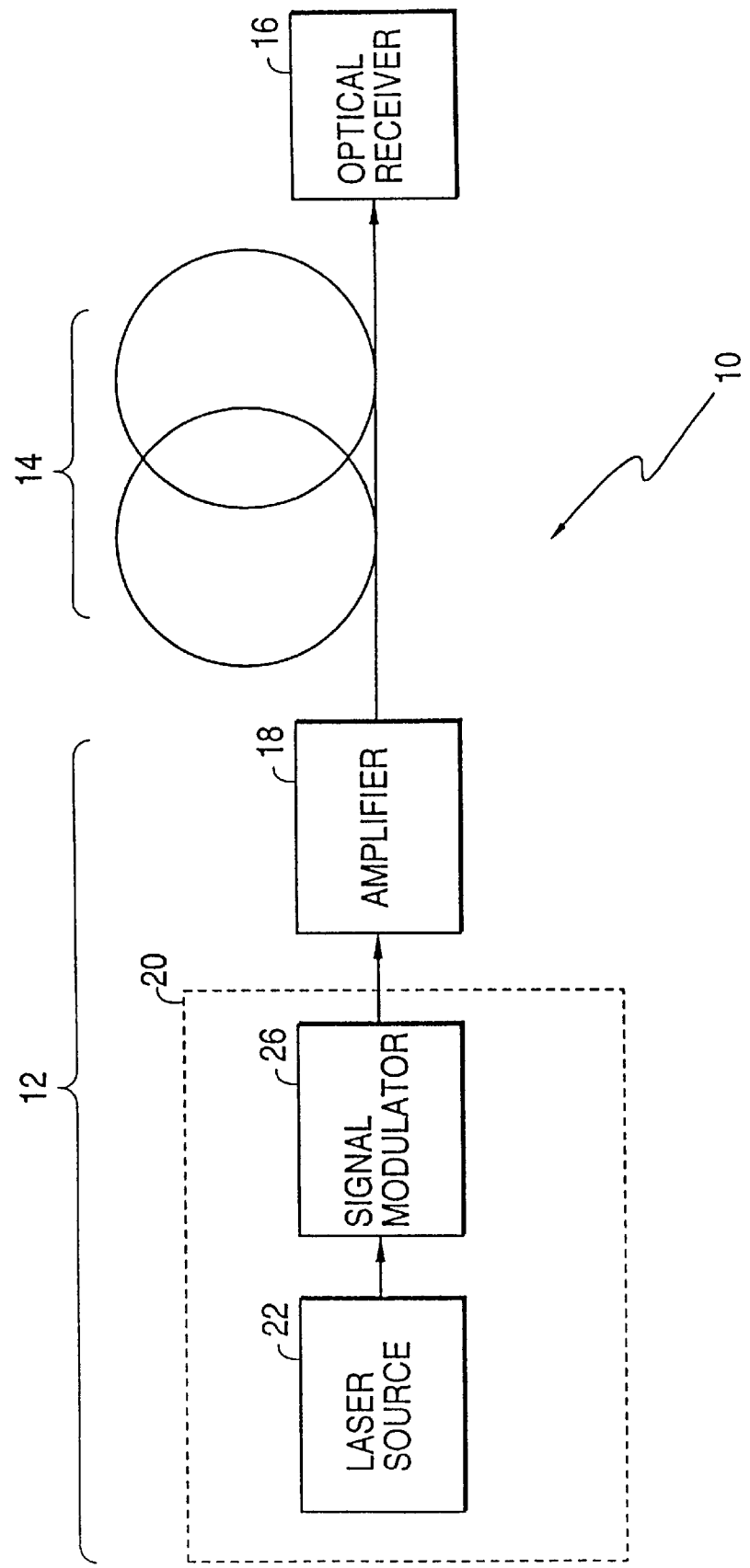
FIG. 7 is a block diagram of a known optical transmission system.

In FIG. 6, laser source 22 is optically coupled through phase modulator 24 to signal modulator 26. First and second CW sources 38 and 38' are combined in combiner 40. The output of combiner 40 is used to frequency modulate laser source 22. In operation, the signals from CW sources 38 and 38' combine in combiner 40 by principals of superposition, and the emitted laser line from laser source 22 shifts in frequency (i.e., frequency modulated) according to the frequency of each of the signals from CW sources 38 and 38'. It will be appreciated that three or more CW sources may be similarly combined to provide a combined signal rich in beat frequencies to spread the spectral width of the optical signal. It will also be appreciated that, in the circuit of FIG. 6, phase modulator 24 is unnecessary; however, combinations of phase modulation according to the circuit of FIG. 5 and frequency modulation according to the circuit of FIG. 6 may be employed to achieve optical spectral broadening.

Combiner circuit 40 may be a simple resistive combiner or a combiner comprised of reactive element (i.e., capacitative and inductive elements that do not dissipate energy) or a hybrid combiner having resistive and reactive elements. The reactive combiner is referred to as a diplexer when two CW signals are combined, and more generally a multiplexer when more than two CW signals are combined.

The effect of generating the multiple beat frequencies with no significant beat frequency within the band width of the information signal is that the beats cause the effective optical spectral width to broaden; therefore, allowing higher optical powers to be injected into a fiber before the onset of stimulated Brillouin scattering.

Having described preferred embodiments of a novel high power optical transmitter in which stimulated Brillouin scattering is suppressed (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims:

What is claimed is:

1. An optical modulator for a high power laser transmitter, comprising:
    a laser source;
    a phase modulator coupled to the laser source;
    a band limited noise source providing a band limited noise signal coupled to at least one of the laser source and the phase modulator; and
    a signal modulator coupled to a broadened optical output signal of the phase modulator, wherein:
        the signal modulator is driven by a modulation signal, the modulation signal being characterized by an upper band limit; and
        the band limited noise source provides the band limited noise signal such that the band limited noise signal is characterized by a lower band limit, the lower band limit being greater than the upper band limit.

2. The optical modulator of claim 1, wherein the band limited noise source is coupled to the laser source.

3. The optical modulator of claim 1, wherein the band limited noise source is coupled to the phase modulator.

4. The optical modulator of claim 1, wherein the band limited noise source includes a wide band noise source coupled through a band limiting filter to provide the band limited noise signal.

5. The optical modulator of claim 1, wherein the laser source is one of a semiconductor distributed feedback laser, a solid state laser and a fiber laser.

6. The optical modulator of claim 1, wherein the laser source lazes in a band about one of 1300 and 1550 nm.

7. The optical modulator of claim 1, wherein the phase modulator is a modulator external to the laser source.

8. The optical modulator of claim 1, wherein the phase modulator includes a $LiNbO_3$ modulator.

9. An optical modulator for a high power laser transmitter comprising:
    a laser source;
    a phase modulator coupled to the laser source;
    a band limited noise source providing a band limited noise signal coupled to at least one of the laser source and the phase modulator; and
    a signal modulator coupled to a broadened optical output signal of the phase modulator, wherein:
        the signal modulator is driven by a modulation signal, the modulation signal being characterized by an upper band limit; and
        the band limited noise source provides the band limited noise signal such that the band limited noise signal is characterized by a lower band limit, the lower band limit being more than twice the upper band limit.

10. The optical modulator of claim 9, wherein the band limited noise source is coupled to the laser source.

11. The optical modulator of claim 9, wherein the band limited noise source is coupled to the phase modulator.

12. The optical modulator of claim 9, wherein the band limited noise source includes a wide band noise source coupled through a band limiting filter to provide the band limited noise signal.

13. The optical modulator of claim 9, wherein the laser source is one of a semiconductor distributed feedback laser, a solid state laser and a fiber laser.

14. The optical modulator of claim 9, wherein the laser source lazes in a band about one of 1300 and 1550 nm.

15. The optical modulator of claim 9, wherein the phase modulator is a modulator external to the laser source.

16. The optical modulator of claim 9, wherein the phase modulator includes a $LiNbO_3$ modulator.

* * * * *